(No Model.)

W. W. JACQUES.
ELECTRIC CABLE COUPLING.

No. 249,840. Patented Nov. 22, 1881.

Witnesses.
Thos. D. Lockwood
Joseph N. Conolly

Inventor;
W. W. Jacques.

UNITED STATES PATENT OFFICE.

WILLIAM W. JACQUES, OF BOSTON, MASSACHUSETTS.

ELECTRIC-CABLE COUPLING.

SPECIFICATION forming part of Letters Patent No. 249,840, dated November 22, 1881.

Application filed June 24, 1881. (No model.)

*To all whom it may concern:*

Be it known that I, WILLIAM W. JACQUES, of Boston, in the county of Suffolk and State of Massachusetts, have invented certain Improvements in Electric-Cable Couplings, of which the following is a specification.

My invention relates to couplings and joints for electric cables, especially for that class of cables which are protected by a covering of lead or metals or alloys of similar soft character.

The couplings and joints herein described are also well adapted to connect different sections of underground-telegraph lines when such lines consist of one or more insulated wires laid in metallic pipes.

The object of my invention is to provide a simple, cheap, air and water tight coupling for the metallic casing of such electric cables and for pipe-section, such as I have described, and one which shall also serve as a joint-box for the conducting-wires of such cables, and at the same time afford ready access and facilities for any repairs or testing operations which may become at any time necessary.

An additional object is to furnish a practical and convenient way of securing the coupling to the metal casing or tube.

My invention consists, broadly, in a metallic joint-box provided at two points, diametrically opposite to one another, with hollow projecting pieces or bosses, which have a screw-thread cut in their interior surfaces for the reception of the ends of the sections of cable which are to be connected; also, in the method by which I connect the said sections to the metallic joint-box.

Figure 1:
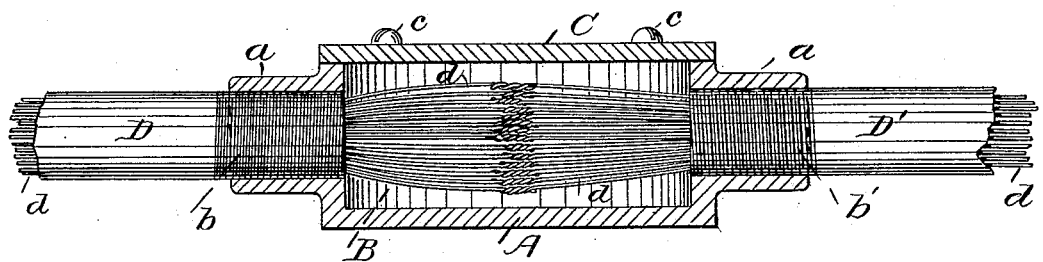
Figure 2:
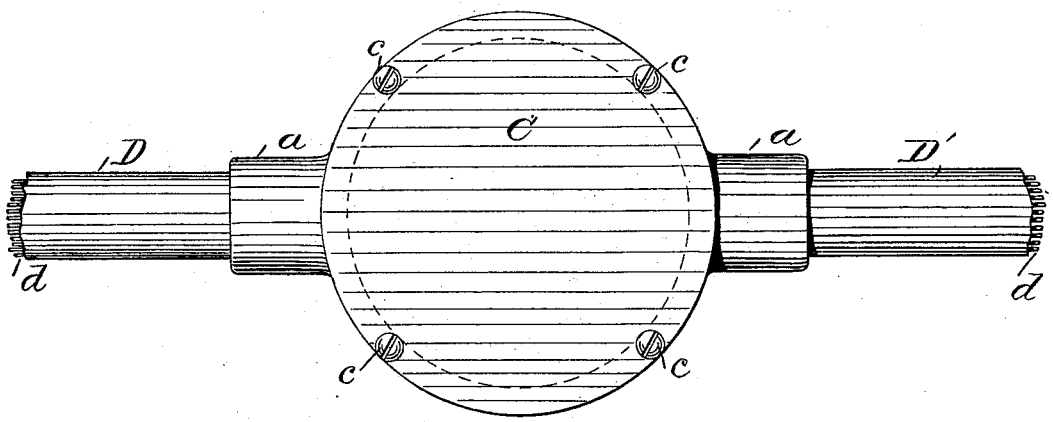

I have illustrated my invention by the accompanying drawings, in which Figure 1 represents a sectional elevation of the coupling, with a section of cable connected at each side, and with the wires of said cable mechanically connected. Fig. 2 is a plan view of my invention, showing the joint-box closed up as it would be while in use.

Proceeding now to the detailed description of my invention, as illustrated in the accompanying drawings, A is the body or main part of the joint-box, which is preferably constructed of cast-iron, but which may be formed, if desired, of any suitable metal.

B is the space within the box, and is designed to contain the ends of the electric conductors *d d*. At diametrically-opposite points on the side of the box, which is preferably made of the shape herein shown, are two projections or bosses, *a a*, which, if the box is made of cast metal, are of one piece with it, and if the box is of wrought metallic substance may be secured to its side with rivets, so as to be air and water tight. These bosses are hollow and form the means of ingress for the conducting-wires of the cables or pipe-sections D D' which are to be connected. Each of the bosses *a a* has a thread cut on its internal surface forming a female screw, but one of the threads *b* is cut in a left-handed direction; the other *b* is cut in a right-handed direction, the result being that when a pipe with a male screw of the corresponding character threaded upon it is inserted into each boss, by turning the box around the screw-connections are simultaneously tightened and thus secured.

It is an essential part of my invention, however, that in the connection of cables which are covered or protected by a tube or pipe of lead, or any other soft metal or alloy, the thread which is cut on the internal surface, being much harder than the metal of the inserted tube, is made to cut the thread on the soft-metal pipe or tube by the mere act of insertion and the subsequent turning round of the joint-box, thus saving the time and labor of having the male thread cut on the ends of the soft-metal cable-covering before such insertion.

D D' represent sections of lead-pipe-covered cable so connected to the coupling. The insulated conductors *d* inclosed in said protective covering on entering the joint-box are separated one from the other, and connected in any desired way in the interior of the box to the corresponding conductors, which enter the coupling through the bosses on the opposite side.

C is a metal covering for the box, which is fastened with screws *c c*, or in any other suitable way, to the top of the box.

In employing my invention to join two sections of lead-covered cable, the ends of said cable DD' are somewhat tapered and introduced into the threaded interior of the protecting bosses *a a*. The box is then turned and the ends of the cables are thus drawn into the bosses *a a*, the thread of the boss cutting its own thread on the lead covering of the cable. The conductors are joined inside the box, and the box filled with melted paraffine or any other suitable insulator or insulating compound, and the cover screwed on.

If at any time it becomes necessary to reach the conductors for testing or repairing purposes the cover is readily removed, heat is applied to the box until the insulating material melts, when the box can be inverted and the insulating material poured out, leaving the joints of the conductor open for inspection.

Although I have specially designed this coupling for the connection of cables which are protected by soft metal, it is well adapted for the connection of pipes of harder material, which are frequently used in underground-telegraph systems. In such use, however, it is evident the thread must be cut on the ends of the pipes before insertion.

I do not restrict myself to any special size or form, since it is obvious that this coupling may be greatly varied without departing from the spirit of my invention.

I claim—

1. A coupling or joint box for metal-covered electric cables, consisting of a box or hollow receptacle provided with bosses or projections arranged opposite to one another, and having holes through them for the reception of the ends of the cables to be connected, said holes being threaded, one with a left-handed and the other with a right-handed screw, whereby any two lengths of cable may simultaneously be securely and tightly connected.

2. A coupling or joint box for metal-protected electric cables, or for pipes containing conducting-wires, said coupling or joint being provided with right and left handed screws, whereby it is adapted for attachment to any consecutive lengths of such cable or tube simultaneously and by the same movement or series of successive movements.

3. The combination, with any two sections of cable covered and protected by lead or any similar metal or material, of a coupling or joint box provided with two hollow bosses, threaded, respectively, one with a right-handed, the other with a left-handed screw, and adapted to cut a corresponding male screw on the soft-metal covering of the cable-sections, substantially as described.

4. The combination, substantially as specified, of a metal-covered electric cable or pipeline, a joint-box for the same, provided with right and left screws for the attachment to the separate lengths of cable, and with an internal space where the conductors of said cable may be severally jointed, and a mass or bed of suitable insulating material filling up said internal space and separating the conductor-joints from one another.

5. A right and left screw-coupling for lead-covered cables, expanding in its center into a hollow receptacle, where the insulated conductors of such cables may be first separately connected and then covered with and embedded in insulating material, substantially as described.

6. A coupling or joint box for electric cables, comprising a box, internally screw-threaded bosses, and a removable lid, substantially as described.

In testimony whereof I have signed my name to this specification, in the presence of two subscribing witnesses, this 21st day of June, 1881.

W. W. JACQUES.

Witnesses:
WM. B. ROSS,
T. D. LOCKWOOD.